UNITED STATES PATENT OFFICE.

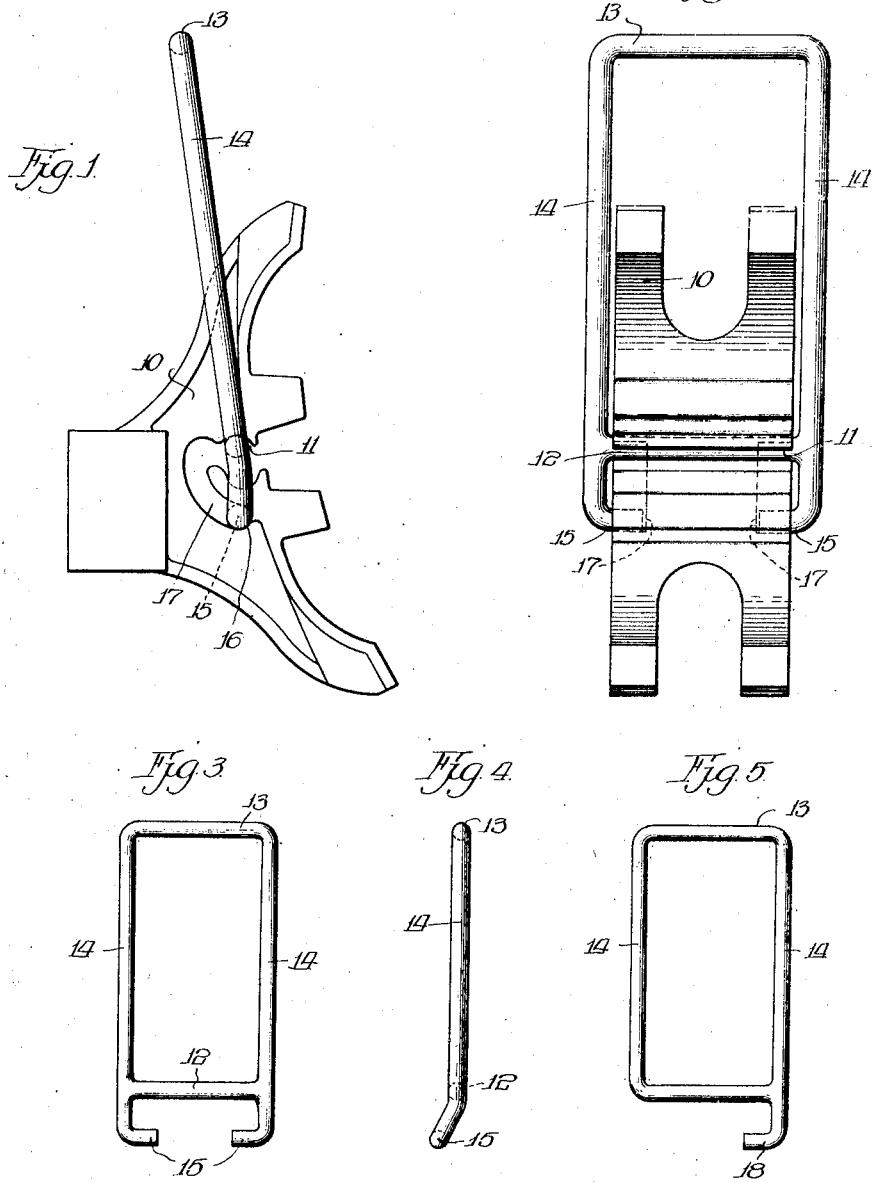

LOREN L. WHITNEY, OF HAMMOND, INDIANA, ASSIGNOR TO AMERICAN STEEL FOUNDRIES, OF CHICAGO, ILLINOIS, A CORPORATION OF NEW JERSEY.

BRAKE-HANGER ARRANGEMENT.

1,335,214.

Specification of Letters Patent. Patented Mar. 30, 1920.

Application filed October 4, 1918. Serial No. 256,807.

*To all whom it may concern:*

Be it known that I, LOREN L. WHITNEY, a citizen of the United States, residing at Hammond, in the county of Lake and State of Indiana, have invented certain new and useful Improvements in Brake-Hanger Arrangements, of which the following is a specification.

This invention relates to brake mechanism and more particularly to brake hanger arrangements, including the operative connection between a brake hanger and brake head.

One of the objects of the invention is to simplify and improve means whereby the brake hanger and brake head to which it is connected cannot accidentally be disconnected even when the usual locking means is ineffective.

Another object is to provide a novel safety connection between the brake hanger and brake head adapted to meet the various requirements for successful commercial use.

These and other objects are accomplished by means of the arrangement disclosed on the accompanying sheet of drawings, in which—

Figure 1 is a side elevation, and Fig. 2 a front elevation of a brake head and hanger embodying my invention;

Fig. 3 is a front elevation, and Fig. 4 a side elevation of the brake hanger; and, Fig. 5 is a front elevation of a modified form of brake hanger.

Referring to the figures of the drawing, it will be noted that I have shown a brake head 10 provided with a transverse opening 11 for the reception of the cross pivotal member 12 of a brake hanger 13. Normally a brake shoe, not shown, is applied to the brake head for closing the opening 11 and thereby preventing the brake hanger from being disconnected from the brake head. It is not safe to rely upon the brake shoe for retaining the hanger in place, for the reason that the brake shoe sometimes becomes worn to the extent that it becomes fractured, or for some other reason is caused to break away from the brake head, in which event the hanger and head may become disconnected, resulting in the brake head and associated beam falling to the track and causing a wreck.

To prevent said hanger and head from being accidentally disconnected, I have provided the side members 14 of the brake hanger with extensions 15 which extend downwardly from the main portions 14 and terminate in laterally or inwardly extending projections which coöperate with the front walls 16 of curved recesses 17 which terminate in the opening 11. The portions 15 of the brake hanger are bent slightly rearwardly to accommodate the proper position of the brake heads with respect to the truck wheels.

By means of this arrangement it is apparent that brake heads will be prevented from rotating in a clockwise direction, as shown in Fig. 1, due to engagement between the complementary hanger projections 15 and the front walls 16 of the recesses 17. Rotative movement of the brake head in the other direction is limited by engagement with the associated truck wheel. When applying the hanger to the head, the hanger is given a horizontal position, the projections 15 first being passed through the opening 11 and back into the curved recesses 17 until the cross pivotal member 12 of the hanger occupies the opening 11, whereupon the hanger is swung around into substantially a vertical position for pivotally supporting the head. It will be understood, of course, that the brake shoe is applied to the head after the hanger is in place.

If it is desired to provide the hanger with but one projection, such as the one 18 shown in Fig. 5, instead of two projections 15, as shown in the other figures of the drawing, the same may be done, it being understood that the projection 18 will coöperate with a walled recess as described hereinabove in connection with the other figures of the drawing.

It is my intention to cover all modifications of the invention falling within the spirit and scope of the following claims.

I claim:

1. In brake mechanism, the combination of a brake head having an opening and a recess in a side wall of the head, a brake hanger having a portion received by said opening to form a pivotal connection between the head and hanger, said hanger also having an inwardly extending projection movable in the recess and also for preventing the head and hanger from being accidentally disconnected.

2. In brake mechanism, the combination of a brake head having an opening and a curved recess extending from said opening and being located in a side wall of the head, and a brake hanger having a transverse portion received by said opening to form a pivotal connection between the hanger and head, said hanger also having an inwardly extending projection mounted within said recess and engageable with a wall thereof for limiting relative movement between the brake head and hanger for preventing the head and hanger from being accidentally disconnected.

Signed at Hammond, Indiana, this 30th day of Sept., 1918.

LOREN L. WHITNEY.